Aug. 1, 1939.   J. A. V. BENARD   2,168,112
MAGNETIC COMPASS
Filed Jan. 29, 1937   3 Sheets-Sheet 1

J. A. V. Benard
INVENTOR

By: Glascock Downing & Seebold
Attys.

Aug. 1, 1939.  J. A. V. BENARD  2,168,112
MAGNETIC COMPASS
Filed Jan. 29, 1937   3 Sheets-Sheet 2

J. A. V. Benard
Inventor

By: Glascock Downing & Seebold
Attys.

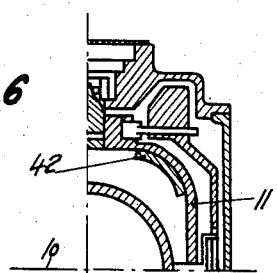
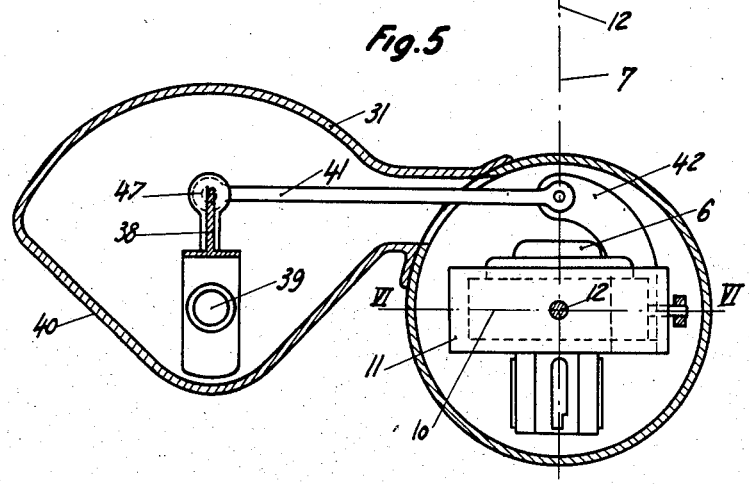
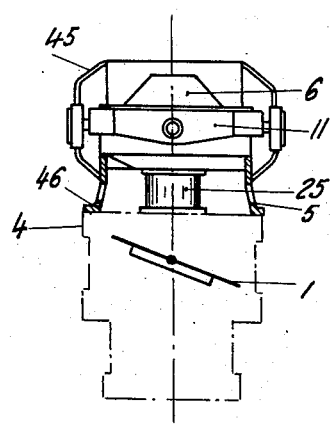

Patented Aug. 1, 1939

2,168,112

UNITED STATES PATENT OFFICE 2,168,112

MAGNETIC COMPASS

Jacques Alfred Victor Benard, Paris, France

Application January 29, 1937, Serial No. 123,045
In Luxemburg January 29, 1936

8 Claims. (Cl. 33—225)

The present invention relates to the magnetic compasses carried by moving objects, such as aircraft capable of taking up variable slopes and accelerations.

It is known that the indications supplied by the compasses hitherto used are upset, when the aforesaid slopes and accelerations occur, by the phenomenon called "change of North" which is caused by the action of the vertical component Z of the magnetic field of the earth.

It is for this reason that it has hitherto been necessary, for supplying indications to the pilot while turning, to arrange on the instrument panel a gyroscope called "directional gyroscope", which is a costly instrument compelling the pilot which uses it to reset the compass before each turn.

The present invention aims at protecting the indications of the compass from the disturbances due to the change of North, and thereby rendering useless the aforesaid directional gyroscope. It essentially consists in associating the magnetic directional element with a device hereinafter called "the device", which compensates the effect of the change of North on the said element and which can include a solenoid or the like producing a vertically directed auxiliary magnetic field, which is in the opposite direction to the vertical component Z of the earth's magnetic field, and is adapted so as to exactly cancel out the action of said component on the said element.

Said device can form an independent unit adapted to co-operate with a magnetic directional element of the usual type and, in this respect, forms part of the invention.

Other characteristics and advantages of the invention will moreover become apparent from the ensuing description made with reference to the accompanying drawings which is solely given by way of an example and in which:

Fig. 5 is a section along the line V—V of Fig. 3;

Fig. 6 is a partial section along the line VI—VI of Fig. 5;

Fig. 7 shows another embodiment in sectional elevation.

Figure 1:
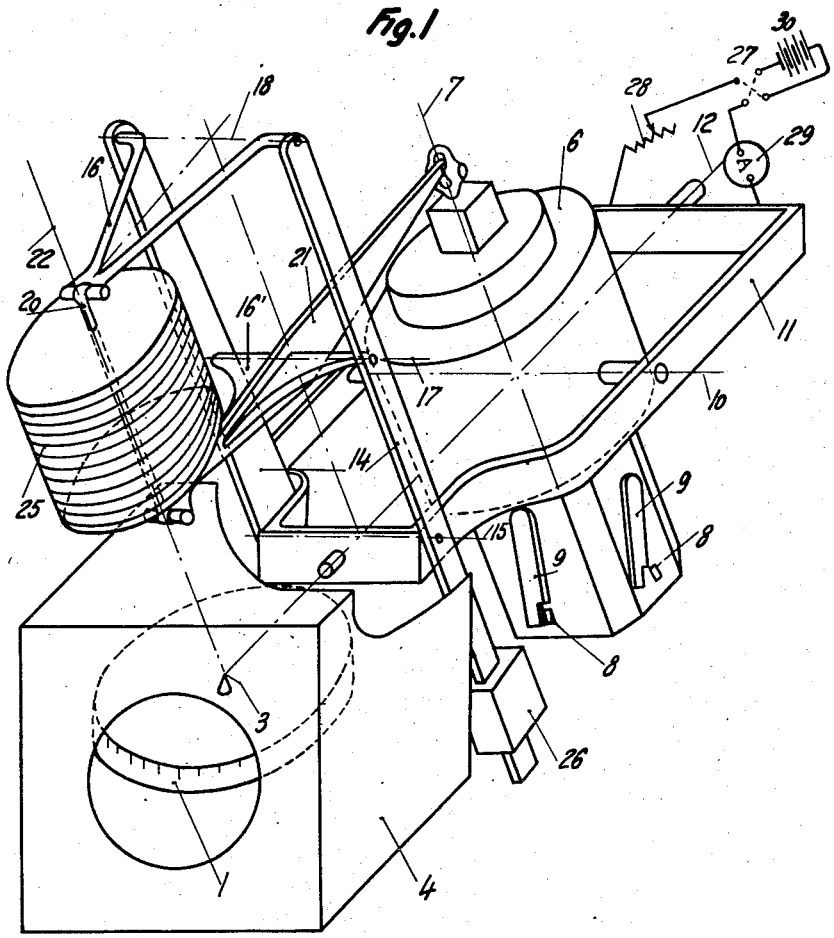
Fig. 1 is a partially broken away perspective view of an embodiment of the invention.

According to the embodiment shown in Fig. 1, it has been assumed that it is required to compensate the effect of change of North on the magnetic directional element 1, the universal pivotal centre of which is at the point 3 and which is arranged inside the casing 4.

A gyro vertical is arranged behind the casing 4. It is assumed to be of a known type and can, for example, be a gyroscope which is identical to that which is used in the apparatus called "artificial horizon". For this purpose, it comprises a casing 6 which contains the rotor (not shown) having the spin axis 7 and driven by the air passing from the openings 8. Said openings 8 are more or less covered in a known manner by pendulous vanes 9 by means of which the axis 7 is restored to the vertical. The casing 6 is pivoted by minor trunnions having the horizontal axis 10 on a gimbal ring 11, which is itself pivoted by major trunnions having the horizontal axis 12 on a fixed support, the arrangement being such that the latter axis 12 passes through the pivotal centre 3.

The gimbal ring 11 carries at its front part a support 14 formed by two uprights hinged on same about an axis 15 which is parallel to the axis 10 and which is in a plane defined by this latter axis and the axis 12. The support 14 carries two hinge members 16 and 16' hinged on said support about axes 17 and 18 which are parallel to the axis 15 and form with an arm 20 connecting their ends a linked parallelogram. The arm 20 is held parallel with the spin axis 7 by an arm 21 forming an extension of the hinge member 16 and is hinged on the other hand to the upper part of the casing 6. The axis 22 of the arm 20, which is thus held parallel to said spin axis 7, passes constantly through the centre 3 owing to the suitable length which is given to the hinge members 16 and 16'.

The arm 20 serves as a support for a solenoid 25 having an axis 22. Said solenoid thus consequently remains at a constant distance from the centre 3, said axis 22 forming the side of an imaginary linked parallelogram having a summit 3 and of which two other sides are respectively the axes 7 and 12.

The articulations of the system are sufficiently accurate to avoid friction and the whole arrangement is suitably balanced by counterweights such as 26 which are judiciously located so as to effect a strictly neutral equilibrium for all the positions, so that only the fixity of the vertical by the gyroscope 6 acts on the whole arrangement.

The current is supplied to the solenoid 25 by the members 16 and 16', which are themselves suitably split and insulated so as not to overcome for straightening the stiffness of the conducting wire, and the supply is effected from the source of direct current 30 through the reversing switch 27, the rheostat 28 and the hot wire ammeter 29.

The latter is graduated in latitudes so that by operating the rheostat 28, the pilot can adjust the current in such a manner that the magnetic field set up by the solenoid 25 always exactly compensates the effect of the vertical component of the earth's field on the magnetic system of the magnetic directional element.

Figure 2:
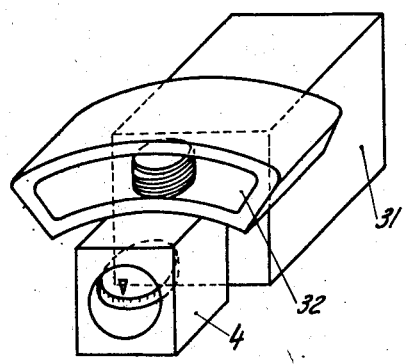
Fig. 2 is a corresponding outside perspective view.
Figure 3:
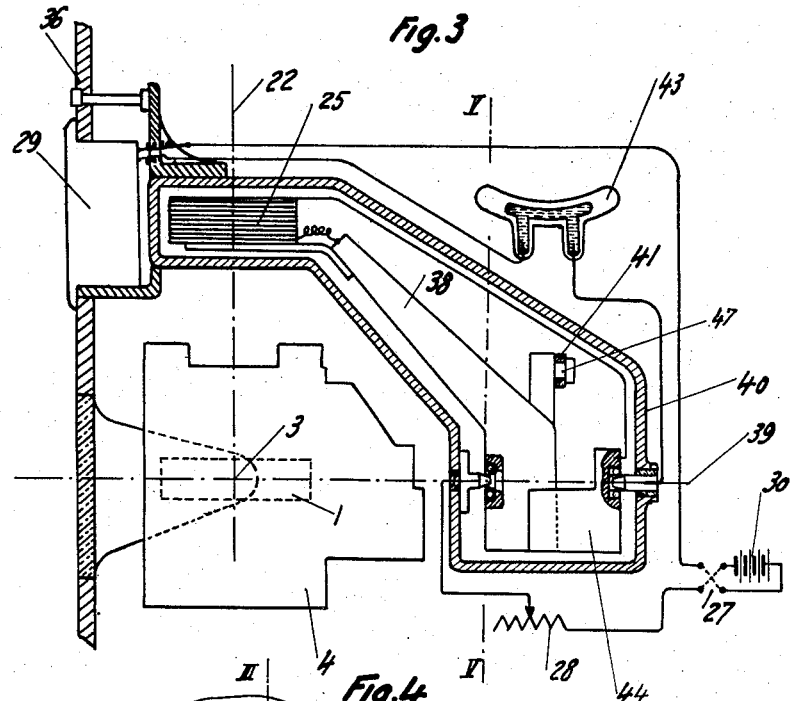
Fig. 3 is a section along line III—III of Fig. 4 of another embodiment.
Figure 4:
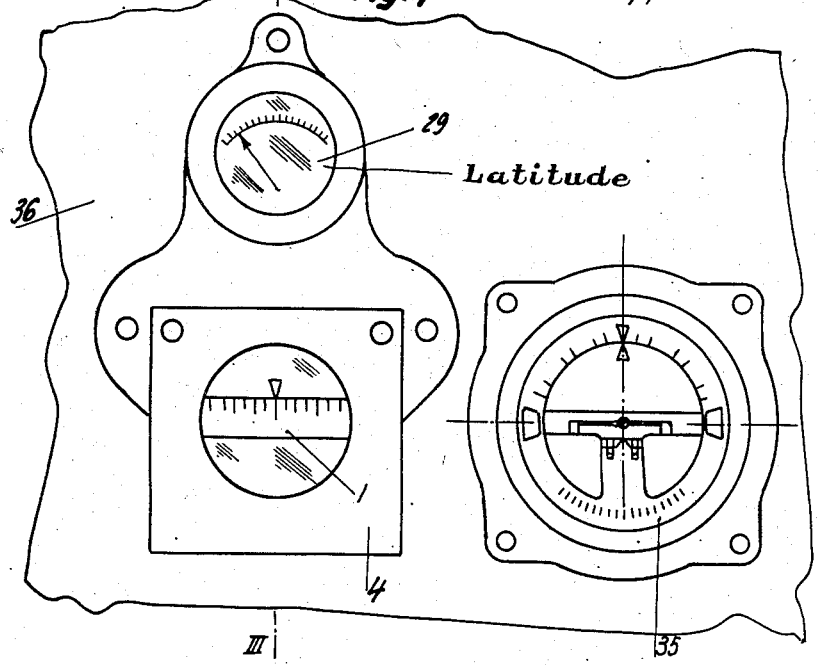
Fig. 4 is a corresponding front view.

The reversing switch 27 enables the current in the solenoid to be reversed at the instant when changing hemispheres. The gyroscope, the hinged system and the solenoid as a whole are enclosed in a housing 31, shown in Fig. 2, in which partial vacuum is produced so as to effect in a known manner the pneumatic drive of the gyroscope. Said housing 31 is made, as is also the casing 4, of absolutely non-magnetic metal so as not to alter the field, and it has at its front part a glass portion 32 through which the solenoid 25 which gives the pilot the vertical remains constantly visible.

Said housing 31 is completely independent of the magnetic directional element and can co-operate with a magnetic directional element of any type of which the housing has the same overall dimensions.

According to the embodiment shown in Figs. 3 to 6, the solenoid 25 is stabilized in the vertical position by the gyroscope of the artificial horizon 35 (Fig. 4) of known type, which is arranged on the instrument panel 36 adjacent the casing 4 of the magnetic directional element and thus athwartship on the aircraft with reference to said casing 4.

The gyroscope of the artificial horizon (Fig. 5) comprises, as in the previous case, a casing 6 containing the rotor of which the spin axis 7 is compelled to assume the vertical. The casing 6 is hinged about an axis 10,—lying athwartship on the aircraft,—in a gimbal ring 11 which is itself pivoted for oscillation about an outer axis 12 lying fore and aft of the aircraft. The solenoid 25 is fixed, so that its axis 22 passes through the pivotal centre 3, on a support 38 hinged on a casing 40 about an axis 39 parallel with the axis 12 and passing through the said centre 3, the balancing being obtained by means of a weight 44.

The swings of the support 38 about the axis 39 are made to take place in unison with the movements of the ring 11 about the axis 12 by means of a rod 41 hinged on a pivot 47 carried by said support 38 and on an extension 42 fixed on the ring 11 and clearly shown in Fig. 6.

It is obvious that this connection maintains the axis of the solenoid 25 parallel to the spin axis 7 of the gyroscope for any athwartship inclination of the aircraft, i. e., any banking in the case of an aeroplane, since the oscillations of the casing 6 about axis 10 in the plane of the axes 7, 12 are not transmitted thereto.

The solenoid is supplied, as in the previous case, from the source 30 (Fig. 3) through a reversing switch 27, a rheostat 28 and a hot wire ammeter 29, the latter being carried on the instrument panel 36 above the compass 4.

A mercury switch 43, arranged fore and aft of the aircraft (perpendicularly to the instrument panel) and adapted to act as an inclinometer is interposed in this circuit so as to cut off the current with a few degrees latitude during the ascents or descents of the aircraft and thereby prevents the solenoid 25, which does not retain the vertical position during said ascents and descents, of creating undesirable disturbances in the indications of the magnetic directional element, the phenomenon of change of North not occurring during said ascents or descents.

The solenoid, the gyroscope and their connecting arrangement are enclosed as a whole in a hermetic housing 31 so as to enable, as in the previous example, the rotor of the gyroscope to be spun by depression, in known manner.

According to the embodiment shown in Fig. 7, the unit consisting of the solenoid 25 and the vertical stabilizing gyroscope 6, which is mounted in a frame 11, is carried by a support 45 fixed on the casing 4 of the magnetic directional element 1 by means of an adaptor member 46. The casing 4 is thus held vertical at the same time as the solenoid, through which latter passes a current which is adjusted, as explained with reference to the previous examples, so as to set up a magnetic field exactly compensating the action of the vertical component Z of the earth field on the magnetic system.

Of course, the invention is in no way limited to the embodiments illustrated and described, which have only been given by way of examples.

While I have described what I at present consider preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim is:

1. In a magnetic compass, a magnetic directional element having a universal pivotal center, a gyro vertical, means mounting said gyro vertical for universal pivotal movement adjacent said element, a solenoid, means supporting said solenoid for pivotal movement, means connecting said gyro and solenoid so that on the one hand the axis of said solenoid is maintained vertical by said gyro with said axis passing through the pivotal center of the element and on the other hand said solenoid is maintained at an invariable distance of said pivotal center irrespective of angular changes of position of the element, a circuit including said solenoid, an ammeter in said circuit graduated in terms of latitude, and an adjustable resistance in said circuit.

2. In a magnetic compass including a magnetic directional element having a universal pivotal center, a gimbal mounting, a gyroscope universally pivoted therein for oscillation about horizontal major and minor trunnion axes and spinning about a vertical axis, a solenoid and a circuit including said solenoid, supporting means for the solenoid pivoted on said gimbal mounting about an axis parallel to said minor trunnions, the axis of said major trunnions passing through said pivotal center, and connecting means between said supporting means and said gyro formed by an articulated system so arranged that the axis of said solenoid constantly passes through said center and is maintained parallel to the spin axis of the gyroscope.

3. A magnetic compass as claimed in claim 2 including further a casing housing the gyro and the solenoid, a glass through which the solenoid is visible and closing the forward end of said casing whereby said solenoid is adapted to be used as horizon indicator.

4. In a magnetic compass for aircraft including a magnetic directional element having a universal pivotal center, a gimbal ring positioned adjacent and forwardly of said element, said gimbal ring being pivoted for oscillation about an outer axis lying fore and aft of the aircraft, a gyro vertical supported within said ring for oscillation about an axis lying athwartship on the craft, a solenoid the axis of which passes vertically through the pivotal center of the element, a circuit including said solenoid, a linkage pivotally supporting said solenoid on said gimbal ring upon a normally horizontal athwartship axis, and means connecting said gyroscope to said linkage to maintain parallel the spin axis of the gyro and the axis of the solenoid, whereby the solenoid axis is maintained passing through the pivotal center of the magnetic directional element.

5. In a magnetic compass for an aircraft including a magnetic directional element having a universal pivotal center, a gimbal ring positioned adjacent of said element, said gimbal ring being pivotal for oscillation about an outer axis lying fore and aft of the aircraft, a gyro vertical supported within said ring for oscillation about an axis athwartship of the aircraft, a solenoid the axis of which passes vertically through the pivotal center of the element, a circuit including said solenoid, supporting means for said solenoid swingably mounted about an axis parallel to said outer axis and passing through said pivotal center, and means connecting said gyroscope to said supporting means to maintain parallel the spin of said gyro and the axis of said solenoid during at least the athwartship inclinations of the aircraft.

6. A magnetic compass as claimed in claim 5 in which said means connecting said gyroscope to said supporting means includes a jointing member connected both to said gimbal ring and to said support.

7. A magnetic compass as claimed in claim 5 including in said circuit a switch adapted to cut out the current when the longitudinal slope of the aircraft is greater than a predetermined amount.

8. A magnetic compass as claimed in claim 5 wherein said gyro vertical is comprised in an artificial horizon indicator, visible horizon indicating means being connected to said gyro.

JACQUES ALFRED VICTOR BENARD.